United States Patent [19]

Penkethman

[11] Patent Number: 4,775,220
[45] Date of Patent: Oct. 4, 1988

[54] OPTICAL SYSTEM WITH LASER PULSE ENERGY CONTROL

[75] Inventor: John A. Penkethman, Gilroy, Calif.

[73] Assignee: Advanced Research and Applications Corporation, Sunnyvale, Calif.

[21] Appl. No.: 123,897

[22] Filed: Nov. 23, 1987

[51] Int. Cl.[4] .................. G02B 26/02; G02B 5/20
[52] U.S. Cl. .................................. 350/394; 350/316; 350/403
[58] Field of Search ............... 350/393, 403, 316, 394

[56] References Cited

U.S. PATENT DOCUMENTS 2,766,659 10/1956 Baerwald .......................... 350/403
4,632,512 12/1986 Haerig et al. ...................... 350/316

Primary Examiner—Bruce Y. Arnold
Attorney, Agent, or Firm—Thomas Schneck

[57] ABSTRACT

An optical system with feedback control of the pulse energy of an attenuated laser pulse output by the system having a laser, attenuators, and a servo control subsystem. The attenuators include a beam attenuator module within the servo loop for variable adjustment of laser beam attenuation, and a plurality of light absorbing filters outside of the servo loop which can be selectively switched into or out of the beam path for further attenuation by known fixed amounts. A Brewster window, a photodiode and associated electronics sample the beam following attentuation by the beam attenuator module, and deliver a feedback signal to a microprocessor. The microprocessor compares the feedback signal and a used input desired pulse energy, then causes the beam attenuator module to adjust the amount attenuation so that the output beam energy is maintained within about five percent of the desired energy.

11 Claims, 3 Drawing Sheets

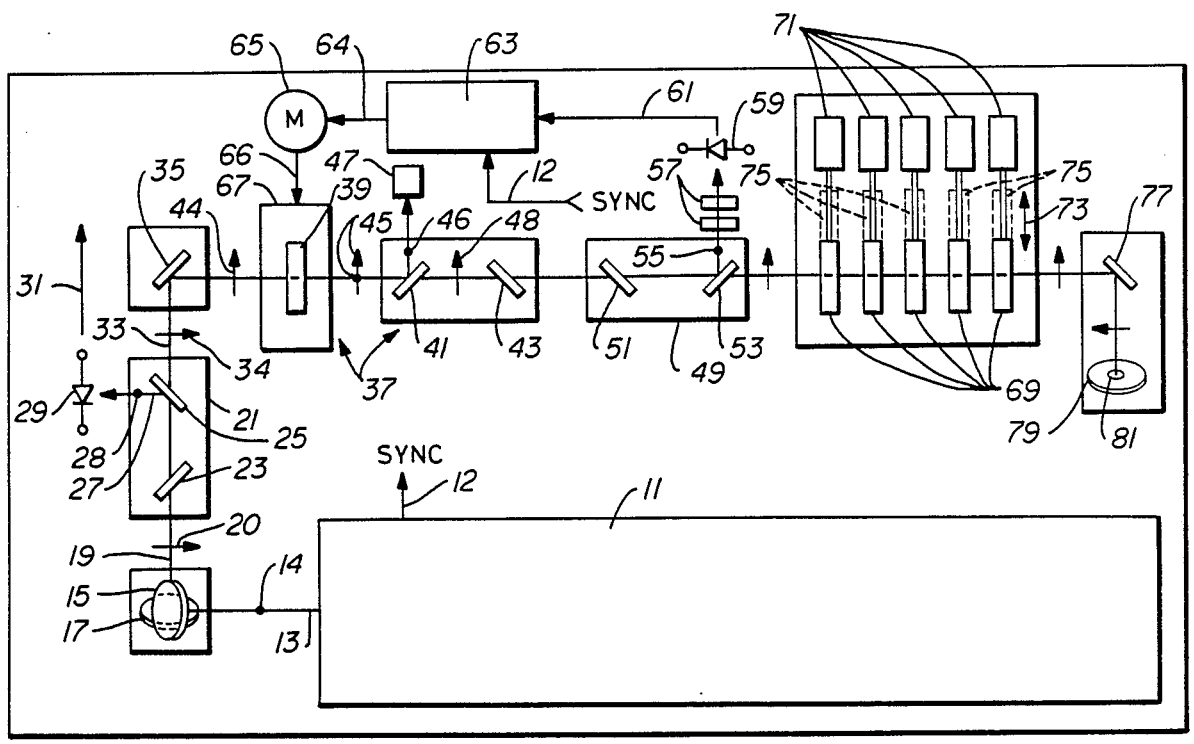
FIG._1.
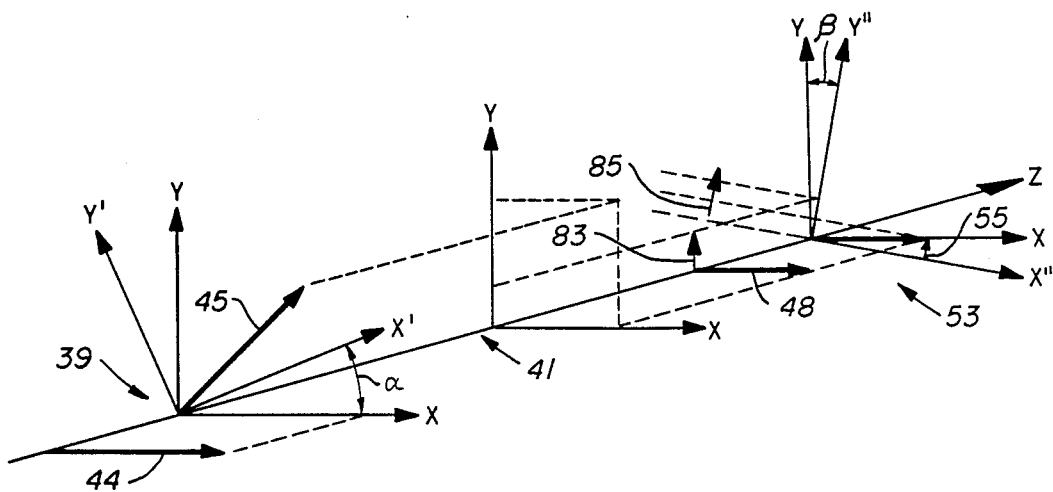
FIG._2.

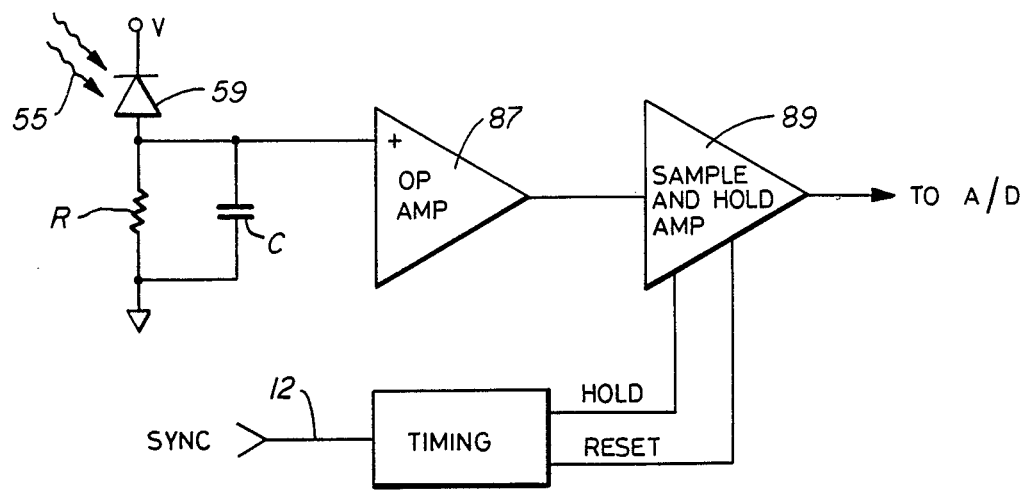
FIG._3.
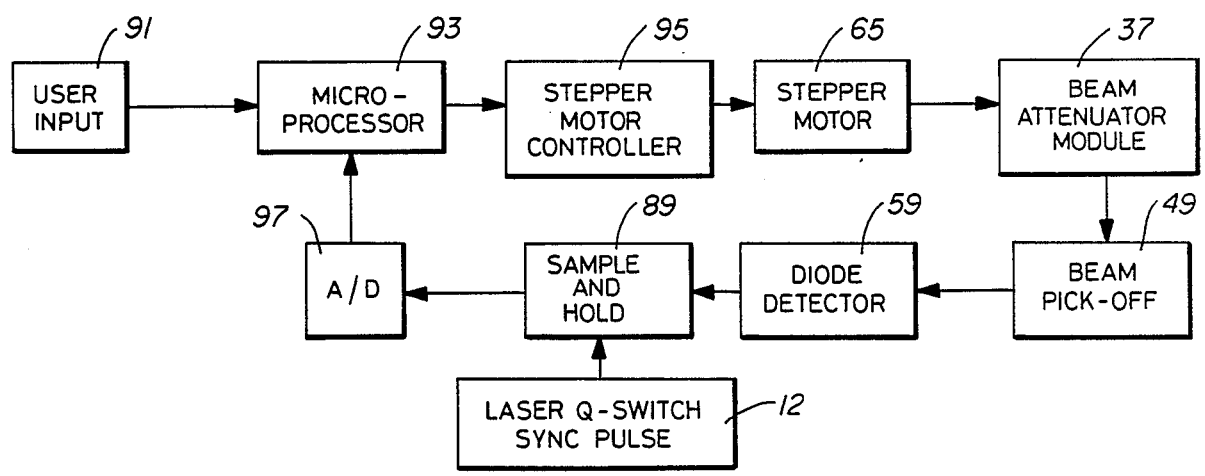
FIG._4.
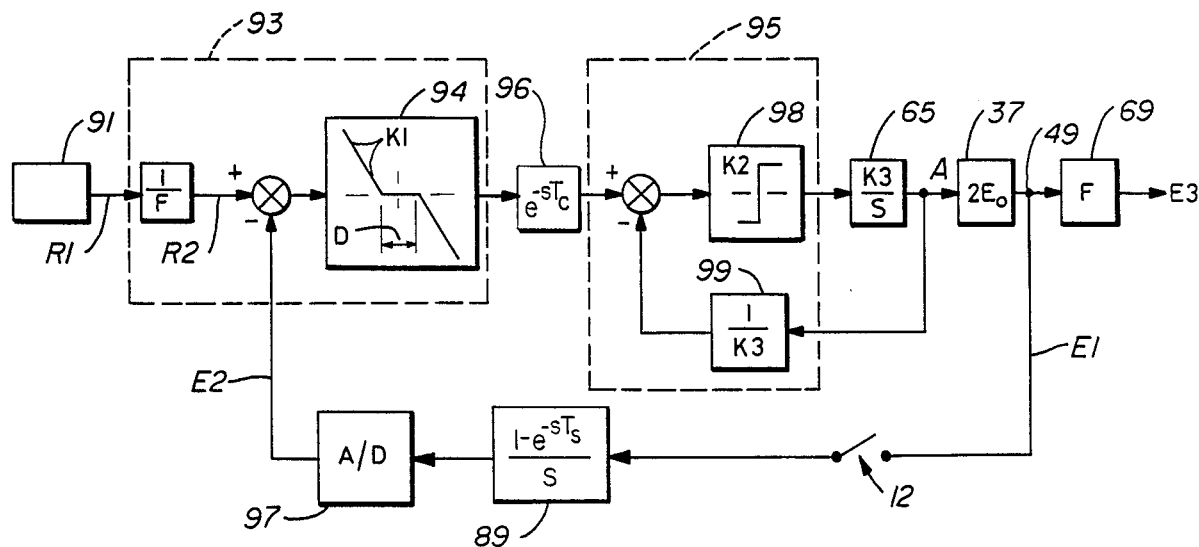
FIG._5.

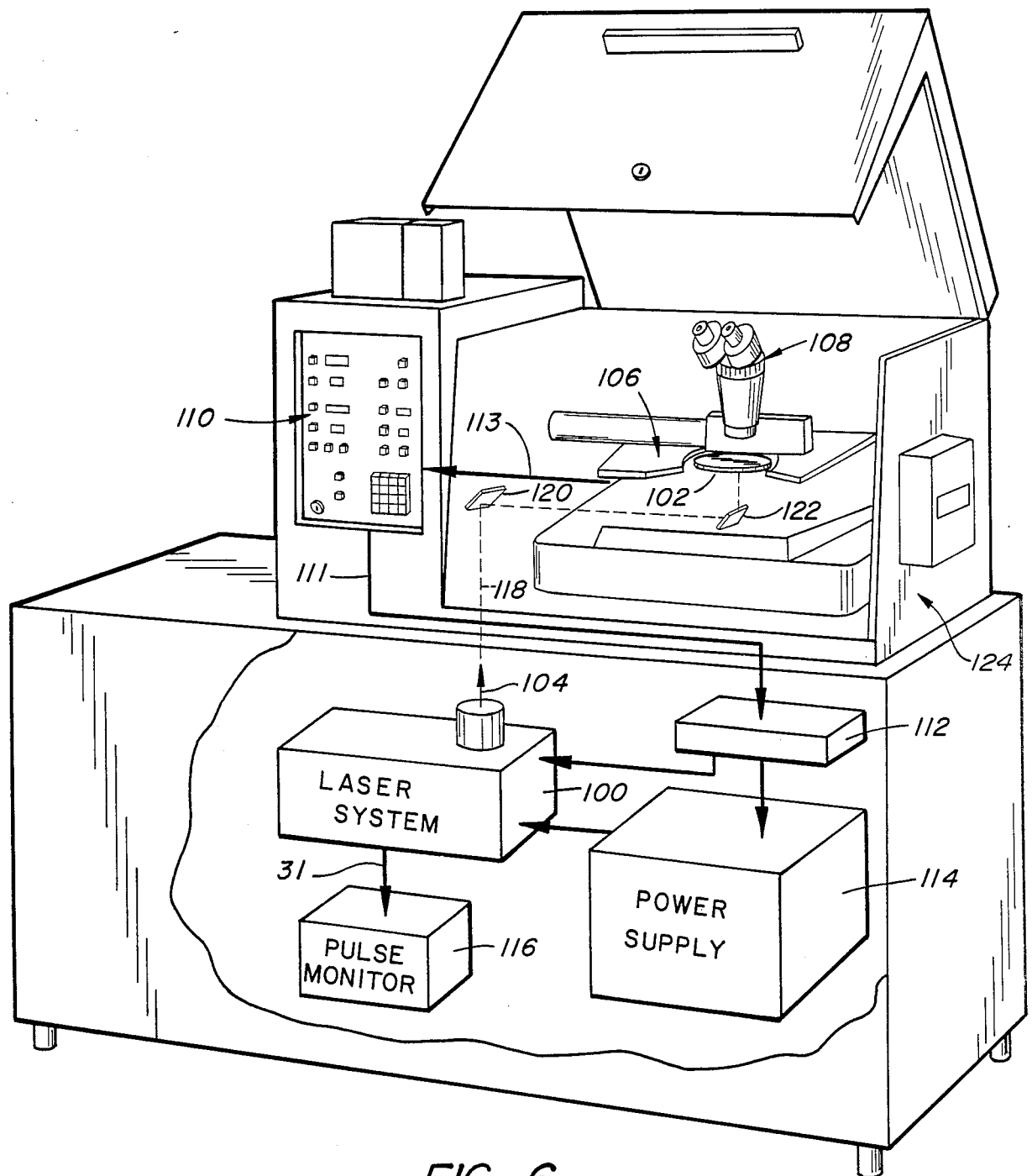
FIG._6.

OPTICAL SYSTEM WITH LASER PULSE ENERGY CONTROL

DESCRIPTION

1. Technical Field

The present invention relates to optical systems with control of one or more particular beam characteristics, and in particular to optical systems with feedback control of pulsed laser output.

2. Background Art

Lasers have been applied to the non-destructive radiation testing of integrated circuits. It is important in some applications that integrated circuits be able to operate while subjected to bursts of radiation. One radiation screening method that has been developed is to irradiate the back side of integrated circuits and other semiconductor devices with light from a pulsed laser. In order to be especially useful, a semiconductor test instrument should be capable of delivering a train of laser pulses whose energies are selectable by user data entry over a range of at least five orders of magnitude.

In U.S. Pat. No. 4,632,512, Haerig et al. discloses a variable laser beam attenuator comprising a laser light source emitting a polarized light beam, a rotatable filter wheel having a plurality of filters therein of differing absorption for obtaining a coarse adjustment of the beam intensity, and a fine adjustment including two plain parallel glass plates disposed in a mutually symmetrically inclined manner in a holder for infinitely variable attenuation. The inclination of the glass plates is selected such that the angle of laser beam incidence is approximately equal to the Brewster angle, and the holder together with the glass plates is adapted to pivot as a unit about the optical axis of the laser beam in order to vary the amount of attenuation.

In addition to delivering a train of laser pulses with energy selectable over five orders of magnitude, an instrument for radiation testing of semiconductors should have several other characteristics. The test instrument should produce a pulse output without adding significantly to the normal pulse-to-pulse variations of the laser. The output from the test instrument should be stabilized against time dependent variations, such as thermal drift and performance degradation of the laser. Each pulse should have the same energy within about five percent of the user selected energy. It is an object of the present invention to provide an optical system suitable for use as a semiconductor irradiation test instrument and having these characteristics.

DISCLOSURE OF THE INVENTION

The above object has been met with an optical system having a laser emitting a pulsed beam, attenuators in the beam path, and a closed loop servo control subsystem for monitoring and adjusting the amount of attenuation of the beam such that the pulse energy of each pulse of the train of attenuated laser pulses output from the optical system matches the user selected pulse energy to within five percent. The attenuators of the optical system include a beam attenuator module comprising a half-wave plate and polarizers. The half-wave plate is rotatable about the beam path under the control of the servo subsystem for variable adjustment of the beam's attenuation. The attenuators of the optical system also include a plurality of light absorbing filters which can be selectively switched in or out of the beam path for further attenuating the beam by known fixed amounts. The filters are situated outside of the control portion of the optical system and operate to bring the pulse energy to within the correct energy range about the desired energy. Sero control is exercised only over two orders of magnitude of pulse energy attenuation achieved by the beam attenuator module.

The servo control subsystem comprises a Brewster window pickoff, situated in the beam path between the beam attenuator module and filters, for sampling a portion of the attenuated beam, a photodiode and associated control electronics producing a feedback signal. The control electronics includes a microprocessor which accepts user input, compares this user input with the feedback signal and sets the desired pulse energy by selecting the filters and adjusting the beam attenuator module. The beam attenuator module and feedback portions of the objects are arranged to eliminate the effects of leakage through the polarizers, which may cause extraneous signals to appear in the feedback and thereby reduce accuracy. The feedback loop has a transfer function which prevents excessive servoing about the desired pulse energy while not adding significantly to the normal pulse-to-pulse variations of the laser.

In the present invention, changes in attenuation by the beam attenuator module are achieved by rotating a half-wave plate. One advantage of this method is that the rotational inertia of the half-wave plate is much less than that of Haerig's above mentioned glass plates and holder assembly and similar attenuators of the prior art, so that stability and response time of the feedback control subsystem is greatly enhanced. A second advantage relates to the requirement that systems with moderate or high power lasers use a beam dump to collect the rejected portion of the beam. In prior systems where glass plates or polarizer plates are rotated, the beam dump must also be rotated since the rejected beam has a fixed relationship to the surface of the rotating plates. This requirement that the beam dump be rotated in prior systems adds to the mechanical complexity and space requirements of such systems as well as greatly adding to the rotational inertia. In the present invention, a rotating half-wave plate with fixed polarizers allows the beam dump to remain fixed.

BRIEF DESCRIPTION OF THE DRAWINGS

FIG. 1 is a top plan of the optical system of the present invention.

FIG. 2 is a schematic illustrating polarization changes of light passing through optical components of the optical system of FIG. 1.

FIG. 3 is an electrical schematic of a detector circuit for use in the feedback portion of the optical system of FIG. 1.

FIG. 4 is a block diagram of a servo control subsystem of the optical system of FIG. 1.

FIG. 5 is a servo diagram illustrating the loop control law of the servo control subsystem of FIG. 4.

FIG. 6 is a side plan of a wafer test system using the optical system of FIG. 1.

BEST MODE FOR CARRYING OUT THE INVENTION

With reference to FIG. 1, a laser 11 emits a pulsed laser light beam 13 directed toward a pair of turning mirrors 15 and 17. Laser 11 is typically a Neodymium-YAG Q-switched laser operating with a pulse repetition rate of 10 Hz, a wavelength of 1,064 nm, a maximum pulse energy of 400 mJ, and a pulse duration of 9 nanoseconds. Other pulsed lasers may also be used. Laser light beam 13 is preferably polarized with a polarization out of the page in FIG. 1 as indicated by dot 14. Turning mirrors 15 and 17 redirect the light beam, with the resulting light beam portion 19 having a polarization indicated in the direction of arrow 20. The polarization directions given here and below are merely exemplary, with modification of the orientations of polarizers and Brewster windows in the optical system capable of being made according to known principles. Top turning mirror 15 turns beam 13 downward, i.e. into the page in FIG. 1, while bottom mirror 17 turns the beam toward the top of the page along a path represented by light beam portion 19 directed toward a pulse profile module 21.

Module 21 includes a thin film polarizer 23 followed by a Brewster angle window 25. Brewster window 25 directs a portion 27 with S-polarization indicated by dot 28 toward a photodiode 29. Photodiode 29 produces an electrical synchronization signal 31 coinciding with the laser pulses. The signal 31 is used by the instrument user to monitor the laser pulse temporal profile. Alternatively, the signal 31 may be adapted with the addition of suitable electronics to provide a laser synchronization pulse. The remaining light beam portion 33 with polarization indicated by arrow 34 is directed to a third turning mirror 35 which redirects the light beam toward a beam attenuator module 37.

Beam attenuator module 37 comprises a half-wave plate 39 and a pair of thin film polarizers 41 and 43. Prior to entering half-wave plate 39, the light beam has a P-polarization indicated by arrow 44 which is subsequently redirected by half-wave plate 39 so as to have both P- and S-polarization components as indicated by the combination arrow and dot 45. Thin film polarizer 41 passes the P-polarization component indicated by arrow 48 while reflecting the S-polarization component as indicated by dot 46 toward a stationary beam dump 47.

The coating selected for thin film polarizers 41 and 43 is typically of the sputter type which has a broad angle of acceptance and maintains its properties under varying conditions obviating the need for an occasional adjustment. However, thin film polarizers are not perfect in that some of the S-polarization component may be passed through. A second thin film polarizer 43 is used to reduce the amount of leakage, since leakage may have a large effect on the accuracy of the feedback system.

The light beam portion then passes to a Brewster window pickoff module 49 comprising a first Brewster window 51 which passes P-polarized light to a second Brewster window 53 oriented so as to direct a predetermined portion of S-polarized light, as indicated by dot 55, through a pair of laser line and attenuation filters 57 to a pulse energy photodiode detector 59. Detector 59 produces an electrical signal 61 directed to feedback electronics 63. Feedback electronics also receives synchronization signal 12 from laser 11. Via an electronic signal 64, feedback electronics 63 directs a motor 65 for adjusting the orientation of half-wave plate 39. Half-wave plate 39 is typically mounted on a stepper-motor-driven rotating stage 67 connected to stepper motor 65.

The light beam portion passed by second Brewster window 53 is directed to a plurality of bulk absorbing neutral density filters 69 which are selectively switchable into and out of the beam path by solenoids 71, as indicated by arrow 73. As shown in FIG. 1, all five filters are presently in the beam path. The positions of filters 69 when out of the beam path are indicated in phantom by dashes 75. The attenuated light beam may then be redirected by a pair of turning mirrors 77 and 79 so as to produce an output beam 81 directed out of the page in FIG. 1.

With reference to FIG. 2, the passage of the light beam through the beam attenuator module 37 and Brewster window pickoff 49 is illustrated. The beam is first polarized as indicated by arrow 44 along an X-axis. This corresponds to the P-polarization component. When a polarized beam is passed through the half-way plate 39 its plane of polarization is rotated by an angle $2\alpha$, where $\alpha$ is the angle of rotation of the half-wave plate measured from its extraordinary optical axis X' relative to the incoming beam polarization direction. The resulting beam 45 has both P- and S-polarization components. The S-component is then rejected by the polarizers 41 and 43. Thus attenuation is achieved by rotating the half-wave plate 39 over an angular range of 45 degrees. The remaining P-polarization component 48 is directed to Brewster angle window 53. Brewster window 53 is a plain glass plate set at Brewster's angle and, as shown in FIG. 2, is rotated about the beam direction by a small angle $\beta$ relative to the attenuator output polarization. By adjusting angle $\beta$, a portion of the beam 55 diverted to the diode can be selected. As already indicated thin film polarizers are not perfect in that some S-polarization is passed through. This leakage is indicated by S-polarization component 83. Representing the incident beam polarization as a vector $[1,0]$, the optical output of the attenuator module 37 can be written as a vector $[\cos(2\alpha), L \sin(2\alpha)]$. L is the S-component transmission through the polarizers. A single polarizer has typical values of L between 0.01 to 0.025. This value varies from plate to plate and from batch to batch and also varies as the plate is angle tuned about the polarizing angle. As will be shown, even these small typical values iof L have a large effect on the feedback accuracy. If the output of the beam attenuator module were perfectly polarized in the X-direction then we would expect to reflect 15% of the Y"-component of the Brewster window of the beam intensity into the diode detector, according to Fresnel's law. This would provide a diode excitation of $0.15 [\sin(\beta) \cos(2\alpha)]^2$, which is proportional to the beam intensity transmitted by the Brewster window. However, leakage will produce a signal to the diode of $0.15 [\cos(\beta) L \sin(2\alpha)]^2$. The leakage is 90 degrees out of phase, as the halfwave plate 39 is rotated, with the correct feedback. The leakage is a function of both L and $\beta$. The intensity to the diode is then proportional to $0.15 [L \cos(\beta) \sin(2\alpha) - \sin(\beta) \cos(2\alpha)]^2$. $L \cos(\beta)$ is comparable to $\sin(\beta)$ for $L = 0.02$ when $\beta$ is about one degree. At that angle we would pick off about 2% of the beam. Thus although the leakage is negligible in the transmitted beam, its presence in the feedback is very significant. In the present invention, the presence of a second thin film polarizer 43, as well as a Brewster angle window 51 reduces the leakage L. Alternatively, we can increase the angle $\beta$ of the Brewster window 53 thus picking off more of the beam, so that the desired component dominates the leakage.

With reference to FIG. 3, a large area reverse biased photodiode 59 is used to collect an entire cross section of the picked-off beam 55. Photodiode 59 is reverse biased. To prevent photocurrent saturation filters 57 attenuate the beam 55. A capacitor C, part of a simple RC network, is charged by the diode photocurrent, and the resulting voltage from the stored charge is then amplified by an operational amplifier 87. Timing is accomplished by a Q-switch synchronization provided by the laser power supply. Synchronization signal 12 is input into a timing processor which produces a hold and a reset signal to a sample-and-hold amplifier. Amplifier 89 is typically calibrated to put out about 0.025 volts per millijoule. The amplified voltage is then sent to an analog-to-digital converter, part of the servo control subsystem of the present invention. The resistance and capacitance of the RC circuit are chosen so that the capacitor is essentially discharged when a picked-off pulse (55) comes in.

With reference to FIG. 4, the pulse energy servo control loop includes the beam attenuator module 37, the Brewster window beam pickoff 49, the pulse energy photodiode detector 59 receiving the picked-off beam from Brewster window pickoff 49, the sample-and-hold circuitry 89 shown in FIG. 3 communicating with the diode detector 59 as well as synchronization pulse 12, an analog-to-digital converter 97 receiving a voltage signal from the sample-and-hold circuitry 89 representing the intensity of the picked-off beam, and a microprocessor 93 receiving a data signal from analog-to-digital converter 97. The microprocessor also communicates with a front panel 91 where a user may input a desired pulse energy value. The microprocessor 93 compares the desired value from front panel 91 with the actual value received from beam pickoff 49 via diode detector 59, sample-and-hold circuitry 89 and analog-to-digital converter 97. The microprocessor 93 then directs a stepper motor controller 95 to activate a stepper motor 65 so as to adjust the orientation of the half-wave plate of beam attenuator module 37. The beam attenuation is thereby corrected until the actual pulse energy is approximately equal to the desired pulse energy.

With reference to FIG. 5, the dynamic range of the feedback circuit is limited, therefore the beam attenuator module 37 is operated only over 2 orders of magnitude. The microprocessor 93 must calculate which range switching filters 69 to use based on the requested pulse energy from the front panel 91. The filters 69 are calibrated and their attenuation values stored in memory accessible to microprocessor 93. The signal R1 in front panel 91 represents the user input, that is the requested or desired pulse energy. Selected filters 69 have a filter attenuation value F. This represents the total attenuation by all of the filters 69 which have been selected by microprocessor 93 and which are located within the beam path. The resulting loop command R2, which is equal to the requested pulse energy R1 divided by the filter attenuation F, will then be within the attenuator range. The microprocessor 93 then puts number $(R2-E2) \times K1$ into a register in motor controller 95, where E2 represents the feedback signal and K1 represents the number of steps by stepper motor 65 per millijoule of beam attenuation corrected by beam attenuator module 37. K1 is typcally about 8.5 stepper motor steps per millijoule of attenuation.

As indicated by the graph 94 within the box for microprocessor 93 the actual number calculated is subject to saturation and dead zone restrictions. The dead zone D is related to the pulse-to-pulse variation in output energy and is calculated for each loop control energy R2. The pulse-to-pulse variation in energy of the laser by itself can be described by a Gaussian curve with a standard deviation of about one percent of the mean. Dead zone D is used in the forward transfer function 94 to avoid constant servoing about the set energy. Since few of the pulses fall exactly on the requested energy, if there were no dead zone the loop would continue to servo on nearly each pulse. This would add to the wear and heating of the motor and controller. Typically the dead zone D has a width of approximately $0.02 \times$ the pulse energy loop command R2.

The box 96 in the loop control block diagram of FIG. 5 represents a computation delay $T_C$ for determining the value to be inserted into the register of motor controller 95. Typically this delay is about 20 milliseconds. Motor controller 95 then counts down the number it has received from microprocessor 93 as it steps the motor 65. The motor stepping command from motor controller 95 as represented by box 98, typically takes place at a motor stepping rate K2 of about 704 hertz. Motor 65 rotates at a rate K3 which is typically 0.01 degrees per step ($1.75 \times 10^{-4}$ radians per step). Feedback path 99 represents the effective action of the motor controller 95. In reality, there is no feedback of the actual half-wave plate rotation angle $\alpha$ from the motor. Instead, motor controller 95 counts its output pulses or steps to determine the amount of motor rotation.

Beam attenuator module 37 has a maximum change of energy attenuation $E_o$ with respect to half-wave plate angle $\alpha$ equal to $2E_o$ at $\alpha = 22.5$ degrss. This change $2E_o$ is typically equal to about 550 millijoules per radian. The attenuator output E1 that is sampled by Brewster window pickoff 49, and a corresponding signal is fed back to microprocessor 93 for evaluation. Laser synchronization pulse 12 acts as a switch for sampling electronics shown in FIG. 3. Sampling typically occurs at a rate $T_s$ of about 10 hertz as represented by box 89 and the resulting sample signal is sent to analogue-to-digital converter 97 which converts the sample signal into a digital feedback signal E2 useful to microprocessor 93.

As a result of this control loop, the useful output E3 of the optical system is equal to the requested pulse energy R1 to within about 5%. The optical system takes only a few seconds to reach and maintain the desired energy.

With reference to FIG. 6, a wafer test system is seen making use of the laser optical system 100 of the present invention, the details of such a laser system having been described above. In the wafer test system, a semiconductor wafer 102 is subjected to ionizing radiation by illuminating the backside of wafer 102 with the attenuated beam output 104 of laser system 100. Wafer 102 is supported on a wafer chuck assembly 106 which includes probes for providing conductive contact with specified points of the wafer. A microscope 108 may be used to target, i.e. locate, a particular area of the wafer to be tested. A user control and display panel 110 is used to select the laser beam intensity over a range of six orders of magnitude. Typically, back surface dose rates as high as $2 \times 10^{12}$ rad (Si)/sec are obtainable. Panel 110 communicates electrically with test system-to-laser system interface electronics 112 via control lines 111, and receives probe signals for sensing possible radiation induced transients from chuck assembly 106 via data lines 113. Panel 110 may then display wafer test results, or alternatively data may be output through one or more parts, not shown, to an external computer for further analysis.

Interface electronics 112 communicate with a laser system power supply 114, as well as the laser optical system 100. Through interface 112, a user selecting particular test parameters on panel 110 may initiate a wafer test, turning on power supply 114 and adjusting the amount of attenuation in optical system 100. Laser pulse monitor electronics 116 receive a laser pulse temporal signal 31 for monitoring the temporal profile of laser pulses. This information may be used together with the probe data on line 113 to determine the phase or timing relationship between laser pulses and any induced transients on the wafer. The attenuated beam 104 travels in an enclosed beam path 118, which is folded by mirrors 120 and 122 so as to terminate on the underside of wafer 102. Additional radiation tests may also be combined with the laser pulse test. For example, total dose testing may be performed by adding an X-ray source and directing a highly collimated beam of X-rays at wafer 102. A cabinet 124 enclosing the wafer chuck assembly 106 and wafer 102 may be light or radiation tight and equipped with a power interlock system to prevent operation until the cabinet 124 is closed.

Accordingly, the present invention may be used to provide early measurement of device hardness, providing the earliest possible indication of process line problems.

I claim:

1. An optical system with control of laser pulse energy comprising,
    a laser emitting a pulsed beam,
    means in a path of the pulsed beam for attenuating the energy of said pulsed beam by a variable first amount,
    means in the path of the once attenuated pulsed beam for further attenuating the energy of the once attenuated pulsed beam by a selected fixed second amount to produce an output beam with a particular pulse energy,
    sampling means receiving a portion of said once attenuated pulsed beam for measuring the energy of said once attenuated beam, said sampling means producing an electrical feedback signal, and
    control means receiving as input said feedback signal and a desired pulse energy for selecting said fixed second amount of attenuation and adjusting said variable first amount of attenuation such that the pulse energy of said output beam is within five percent of the desired pulse energy.

2. The optical system of claim 1 wherein said means for attenuating by said variable first amount comprises,
    a half-wave plate positioned in the pulsed beam path, said pulsed beam being linearly polarized in a first direction, an extraordinary axis of said half-wave plate being oriented in a second direction at a variable first angle relative to said first direction,
    means responsive to said control means for rotating said half-wave plate about said pulsed beam path so as to adjust said variable first angle, and
    at least one polarizer positioned in said pulsed beam path after said half-wave plate, said at least one polarizer passing a polarization component of said pulsed beam which is parallel to said first direction and blocking passage of a substantial portion of a polarization component of said pulsed beam which is perpendicular to said first direction.

3. The optical system of claim 1 wherein said means for further attenuating said once attenuated pulsed beam comprises a plurality of light absorbing filters with known fixed amounts of attenuation, and means responsive to said control means for selectively moving any number of said filters into the path of said once attenuated pulsed beam.

4. The optical system of claim 1 wherein said sampling means comprises,
    a window set at Brewster's angle in the path of the once attenuated pulsed beam, said window oriented with respect to the polarization of the beam so as to redirect a portion of said beam along a separate optical path,
    a photodetector for measuring the intensity of the redirected beam portion, said photodetector producing an electrical signal representative of said intensity, and
    means for storing said electrical signal for a predetermined number of laser pulses.

5. The optical system of claim 4 wherein said means for storing said electrical signal comprises a resistor-capacitor network electrically connected to said photodetector.

6. The optical system of claim 1 wherein said control means comprises,
    a microprocessor receiving as input a user selected desired pulse energy and said feedback signal representing the actual pulse energy of said output beam, said microprocessor being in communication with said means for further attenuating so as to select said second fixed amount of attenuation, said microprocessor including means for calculating a number of motor steps, in accordance with a control law, for correcting any difference between said desired pulse energy and said actual pulse energy,
    a motor controller communicating with said microprocessor for receiving said number of motor steps from said microprocessor, and including means for producing a motor stepping command, and
    means responsive to said motor stepping command for varying the first amount of attenuation.

7. The optical system of claim 6 wherein said control law includes a dead zone within a predetermined range about said desired pulse energy, said microprocessor calculating a correction of zero steps when said difference between desired and actual pulse energies is within said dead zone.

8. An optical system comprising,
    means for producing a polarized light beam, said beam having a polarization in a first direction,
    a half-wave plate positioned in the light beam path, an extraordinary axis of said half-wave plate being oriented in a direction at a variable first angle relative to said first polarization direction of said light beam,
    polarizing means positioned in the beam path following said half-wave plate for blocking passage of a substantial portion of a polarization component of said beam which is perpendicular to said first direction, both said half-wave plate and said polarizing means together thereby causing attenuation of the light beam by a variable first amount corresponding to said variable first angle,
    means positioned in the beam path following said polarizing means for further attenuating said light beam by a selected fixed second amount to produce an output beam,
    a window set at Brewster's angle in the path of said light beam between said polarizing means and said means for further attenuating, said window oriented with respect to said first polarization direction so as to redirect a portion of said beam along a separate path, a photodetector positioned to intercept said redirected beam portion, said photodetector producing an electrical feedback signal representative of the intensity of redirected beam portion, a microprocessor in electrical communication with said photodetector and receiving said feedback signal as input, said microprocessor also receiving as input a desired pulse energy for said microprocessor to select said second amount of attenuation, and means responsive to commands from said microprocessor for adjusting said variable first angle of said half-wave plate.

9. The optical system of claim 8 wherein said microprocessor includes means for comparing said desired pulse energy with said feedback signal and for producing commands representing the amount of adjustment to said variable first angle to be performed in accordance with a feedback control loop law.

10. The optical system of claim 9 wherein said means for adjusting said variable first angle comprises, a motor controller in communication with said microprocessor and receiving commands from said microprocessor representing an amount of correction of said variable first angle, and a stepper motor responsive to said motor controller and connected to said half-wave plate in first angle adjusting relationship.

11. The optical system of claim 9 wherein said feedback control loop law includes a dead zone within a range about said desired pulse energy, said microprocessor commanding no adjustment of said variable first angle whenever the pulse energy of the output beam is within said dead zone.

* * * * *